US006705574B2

(12) United States Patent
Nakagawa et al.

(10) Patent No.: US 6,705,574 B2
(45) Date of Patent: Mar. 16, 2004

(54) CABLE MOUNTING STRUCTURE

(75) Inventors: Akio Nakagawa, Tokyo (JP); Tetsuzo Nakazawa, Tokyo (JP); Takashi Sato, Tokyo (JP); Takaki Tsutsui, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 0 days.

(21) Appl. No.: 10/238,721

(22) Filed: Sep. 11, 2002

(65) Prior Publication Data

US 2003/0052234 A1 Mar. 20, 2003

(30) Foreign Application Priority Data

Sep. 19, 2001 (JP) .................................... P.2001-285505

(51) Int. Cl.[7] ................................................... F16L 3/00

(52) U.S. Cl. ............................ 248/49; 248/56; 248/73; 361/826

(58) Field of Search ............................ 248/56, 73, 70, 248/49, 65; 312/223.1, 223.6; 361/829, 826; 174/72 A, 101, 68.3

(56) References Cited

U.S. PATENT DOCUMENTS

| | | | | | |
|---|---|---|---|---|---|
| 719,817 | A | * | 2/1903 | Kunze | 138/99 |
| 1,098,775 | A | * | 6/1914 | Wheelock | 285/216 |
| 2,840,629 | A | * | 6/1958 | Roth et al. | 174/35 TS |
| 3,580,988 | A | * | 5/1971 | Orlowski et al. | 174/153 G |
| 3,582,030 | A | * | 6/1971 | Barrett, Jr. | 248/68.1 |
| 4,481,269 | A | * | 11/1984 | Barrett, Jr. | 429/121 |
| 4,775,122 | A | * | 10/1988 | McClymont | 248/74.4 |
| 4,895,338 | A | * | 1/1990 | Froutzis | 248/503.1 |
| 5,272,934 | A | * | 12/1993 | Chegash et al. | 74/502.4 |
| 5,292,013 | A | * | 3/1994 | Earl | 248/73 |
| 5,360,188 | A | * | 11/1994 | Condon | 248/56 |
| 5,383,796 | A | * | 1/1995 | Bowen et al. | 439/469 |
| 5,395,079 | A | * | 3/1995 | Jensen et al. | 248/62 |
| 5,605,309 | A | * | 2/1997 | Nadherny | 248/62 |
| 6,105,216 | A | * | 8/2000 | Opperthauser | 24/459 |
| 6,241,199 | B1 | * | 6/2001 | Ismert | 248/56 |

FOREIGN PATENT DOCUMENTS

| | | | | |
|---|---|---|---|---|
| DE | V004998 | * | 9/1955 | 248/68.1 |
| JP | 8182151 | * | 12/1994 | |

* cited by examiner

*Primary Examiner*—Korie Chan
(74) *Attorney, Agent, or Firm*—Whitham, Curtis & Christofferson, P.C.

(57) ABSTRACT

In a cable mounting structure, a casing body is formed with a through hole through which a cable is inserted. A first retainer is secured to a first part of the cable and fitted with the through hole. A second retainer is attached on the casing body while holding a second part of the cable. The first retainer is an elastic member having a groove fitted with an edge of the through hole. The second retainer includes a retaining member provided on the casing body while being formed with a guide groove, and a holding member detachably fitted into the guide groove.

3 Claims, 2 Drawing Sheets

CABLE MOUNTING STRUCTURE

BACKGROUND OF THE INVENTION

The present invention relates to a cable mounting structure, and more particularly to the cable mounting structure for mounting the cable to a controller case to be employed in a game controller or the like.

A related-art mounting structure of this type will be described referring to FIG. 3. In the drawing, the cable mounting structure 1 is so constructed that an insertion hole 4 is formed in an engaging part of a side plate 3 of a case 2 which is composed of an upper case and a lower case (only the lower case is shown in this figure), a cable 5 is inserted into the case 2 through the insertion hole 4, and at the same time, the cable 5 is retained in the case 2.

More specifically, several pieces of boss ribs 7 are provided in an upright manner on a bottom plate 6 of the case 2 in proximity to and apart from one another. By passing the cable 5 around the boss ribs 7, the cable 5 is pressed to the boss ribs 7 to be retained between them. In the drawing, numerals 8 and 9 designate connectors.

In this manner, the cable 5 is retained in the case 2, and maintains retaining force against a force from an exterior of the case 2.

However, in a method for retaining the cable by the boss ribs 7, there has been a problem in quality that a bite of the cable 5 is likely to occur, resulting in a break down of the cable 5 or a drop of the cable 5 because the boss ribs 7 may be broken due to a stress. There has been a further problem that an assembling work for passing the cable 5 around the boss ribs 7 has been inferior in workability.

SUMMARY OF THE INVENTION

It is therefore an object of the present invention to provide a cable mounting structure in which damages of the cable and the cable mounting members can be avoided to improve the product quality, and the workability for mounting the cable can be enhanced.

In order to achieve the above object, according to the present invention, there is provided a cable mounting structure, comprising:

a cable;

a casing body formed with a through hole through which the cable is inserted;

a first retainer, secured to a first part of the cable and fitted with the through hole; and a second retainer, attached on the casing body while holding a second part of the cable.

In this configuration, since the cable can be reliably and easily mounted, the retaining force against a force from the exterior of the casing body can be well maintained, and the workability can be improved.

Preferably, the first retainer is an elastic member having a groove fitted with an edge of the through hole. In this configuration, the flexibility of the cable will not be damaged.

Preferably, the second retainer includes a retaining member provided on the casing body while being formed with a guide groove, and a holding member detachably fitted into the guide groove. In this configuration, the second retainer can be easily fabricated and assembled.

Here, it is preferable that the holding member includes a semitubular portion in which the second part of the cable is placed and flat pieces protruded from both side portions of the semitubular portion and extending in an axial direction of the semitubular portion. The guide groove includes a first groove and a second groove, into which the flat pieces are fitted.

Further, it is preferable that a stopper is formed on one end portion in the extending direction of each flat piece to plenarily position the semitubular member at a predetermined position with respect to the retaining member.

Preferably, a part of the guide groove is made narrow to retain the holding member fitted therein.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
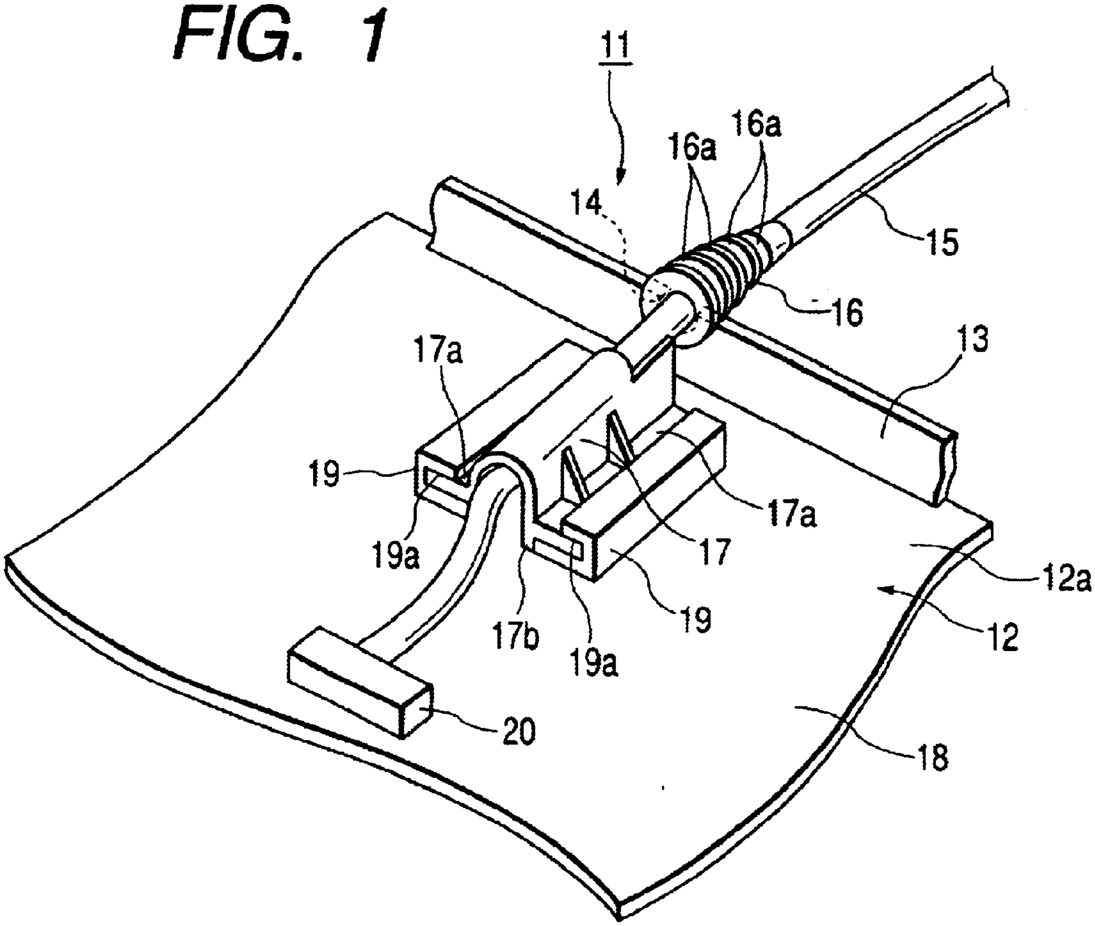
FIG. 1 is a perspective view of a cable mounting structure according to one embodiment of the present invention.

One preferred embodiment of the present invention will be described in detail referring to FIGS. 1 and 2. As shown in FIG. 1, the cable mounting structure 11 is so constructed that an insertion hole 14 is formed in an engaging part of a side plate 13 of a case 12 which is composed of an upper case (not shown) and a lower case 12*a*, a cable 15 is inserted into the case 12 through the insertion hole 14, and at the same time, the cable 15 is retained in the case 12. In the drawing, numeral 20 designates a connector.

More specifically, an elastic body 16 formed with a plurality of annular grooves 16*a* is secured around an outer periphery of the cable 15. Moreover, there is provided inside the case 12, a cable holder 17 which will be described below. A circumferential edge of the insertion hole 14 is held by wall portions of the annular grooves 16*a* of the elastic body 16, and the cable 5 is retained by the cable holder 17, so that the cable 15 can be mounted to the case 12.

Figure 2:
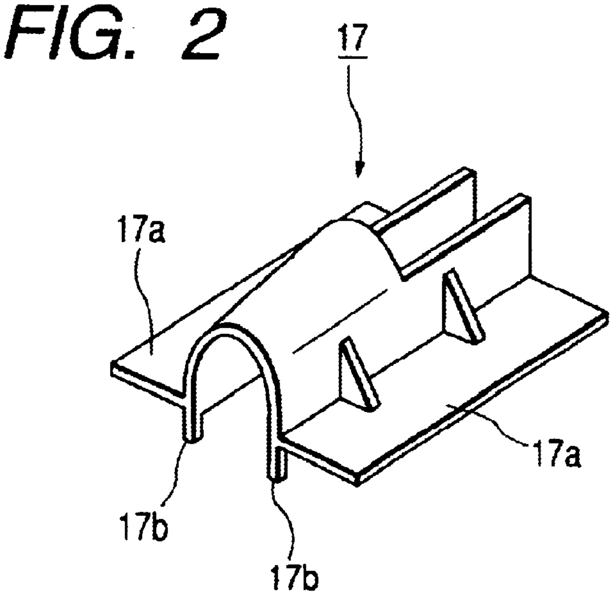
FIG. 2 is a perspective view of a cable holder in the cable mounting structure.
Figure 3:
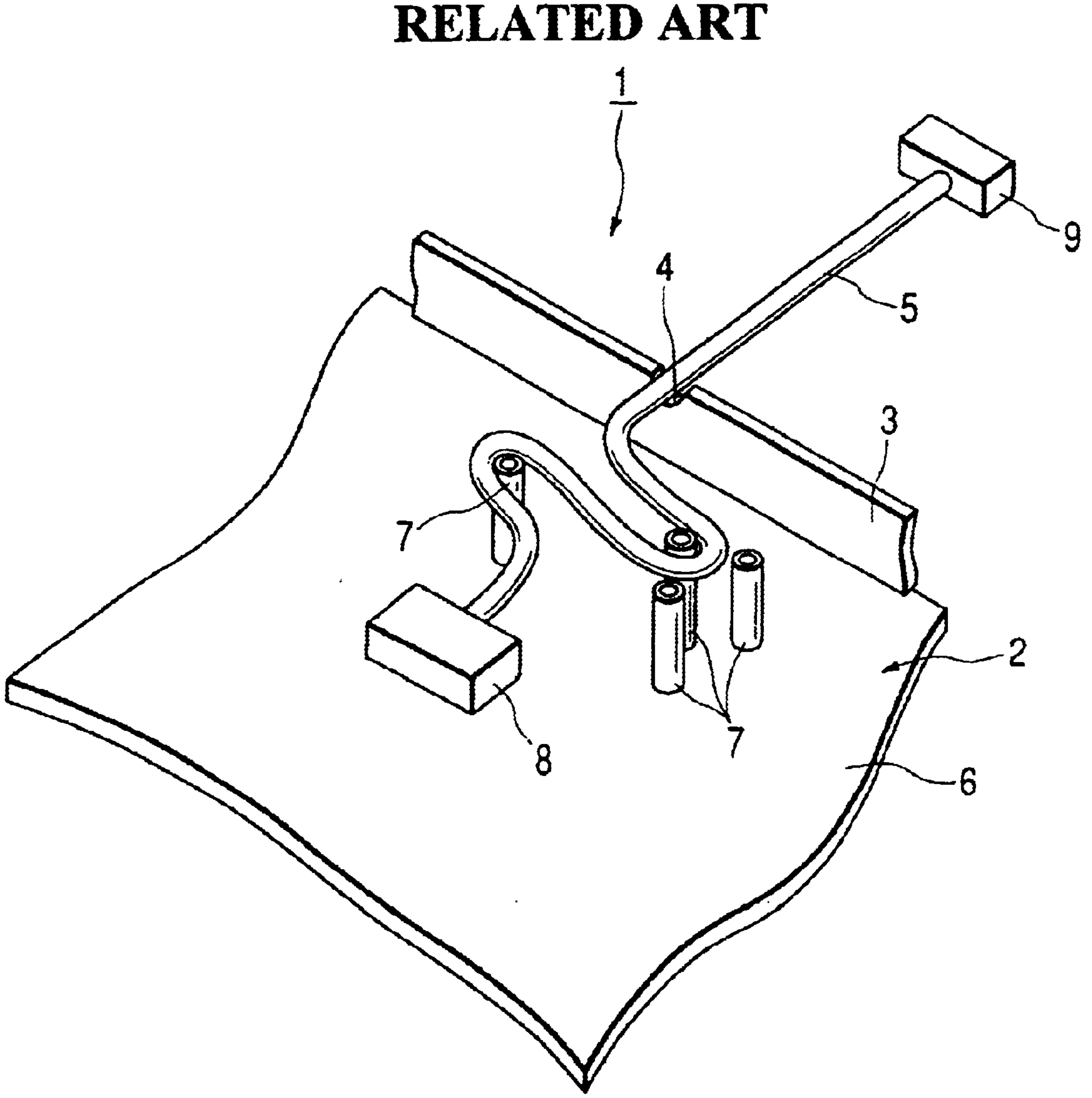
FIG. 3 RELATED ART
FIG. 3 is a perspective view of a related-art cable mounting structure.

As shown in FIG. 2, the cable holder 17 is formed of a U-shaped flat plate, and includes sliding portions 17*a* formed at its both end portions, in an outwardly bent at a substantially right angle. Further, there are provided stoppers 17*b* in a shape of protuberance at one longitudinal end of each sliding portion 17*a*.

Meanwhile, as shown in FIG. 1, there are provided on an inner bottom face 18 of the case 12, laterally arranged retainers 19 which are formed with guide grooves 19*a* so as to guide and hold the sliding portions 17*a*. A part of each guide groove 19*a* is made narrow so as press and retain the associated sliding portion 17*a*, when the sliding portions 17*a* are slid to a predetermined position. The cable holder 17 is plenarily positioned with respect to the retainers 19 by the stoppers 17*b*.

The cable 15 is first embraced by the cable holder 17, and then the sliding portions 17*a* of the cable holder 17 are slid into the guide grooves 19*a* of the retainers 19, so that the cable 15 can be held in the case 12 by the cable holder 17.

Accordingly, the cable 15 is retained by the side plate 13 of the case 12, because the elastic body 16 fixed to the cable 15 is retained at the circumferential edge of the insertion hole 14 which is formed in the engaging part of the case 12, and at the same time, held on the inner bottom face 18 of the case 12 by the cable holder 17 and the retainers 19.

Since the elastic body 16 can be easily formed, and can reliably retain the cable 15, maintaining the retaining force against an external force, but will not damage flexibility of the cable 15.

In addition, the cable holder 17 can also hold the cable 15 easily and reliably, and improvement of the quality can be attained, eliminating those probabilities such as a bite or a rapture of the cable, a crack of the boss ribs, damages of the cable and the mounting members which have been likely to occur in the related-art structure. At the same time, the workability can be enhanced, because the cable mounting structure can be easily fabricated and assembled, and the cable can be easily mounted by the structure.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A cable mounting structure comprising:

a cable;

a casing body formed with a through hole through which the cable is inserted;

a first retainer, secured to a first part of the cable and fitted with the through hole; and a second retainer, attached to the casing body while holding a second part of the cable that is between the first part of the cable and an end of the cable to be connected to a device in the casing body, wherein:

the second retainer includes a retaining member provided on the casing body while being formed with a guide groove, and a holding member detachably fitted into the guide groove;

the holding member includes a semitubular portion in which the second part of the cable is placed and flat pieces protruding from both side portions of the semitubular portion and extending in an axial direction of the semitubular portion; and the guide groove includes a first groove and a second groove, into which the flat pieces are fitted; and a stopper is formed on one end portion and extending downwardly from each flat piece to plenarily position the semitubular member at a predetermined position with respect to the retaining member.

2. The cable mounting structure as set forth in claim 1, wherein the first retainer is an elastic member having a groove fitted with an edge of the through hole.

3. The cable mounting structure as set forth in claim 1, wherein a part of the guide groove is made narrow with respect to said flat pieces protruded from both side portions of the semitubular portion to retain the holding member fitted therein.

* * * * *